Jan. 9, 1951     R. S. FARR     2,537,217
FILTER UNIT
Filed Sept. 27, 1946     2 Sheets-Sheet 2
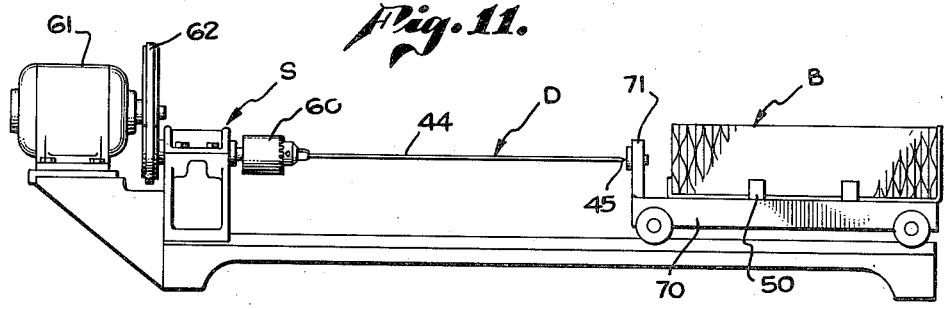
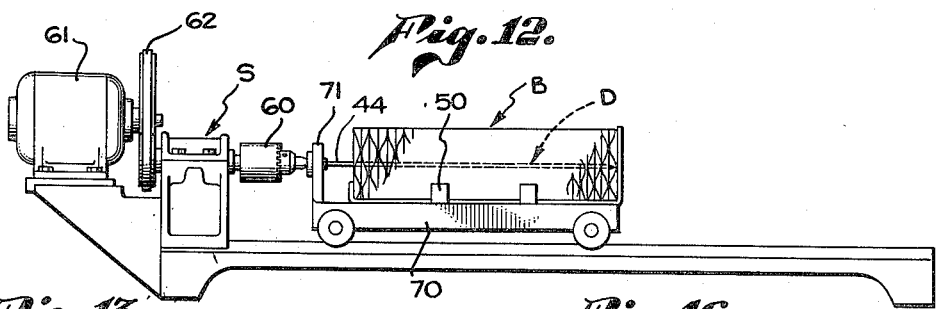
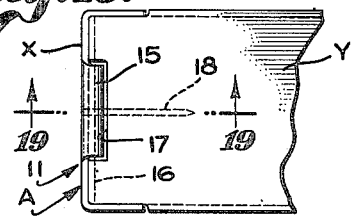
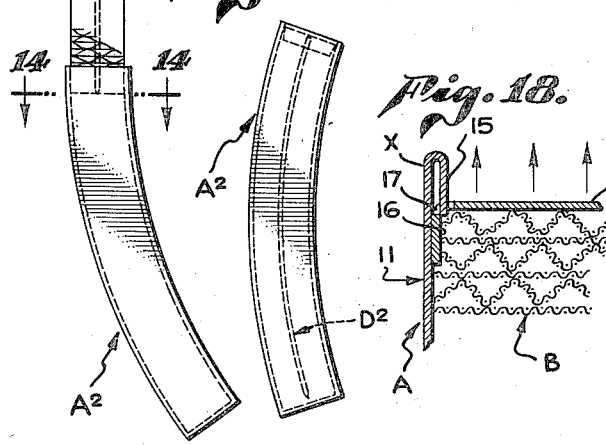
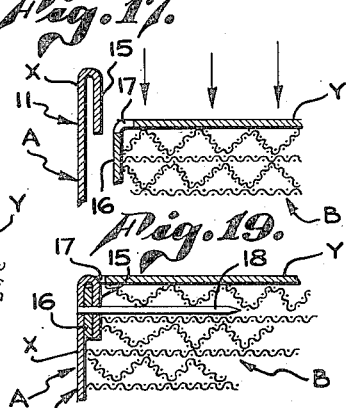
INVENTOR
Richard S. Farr
BY
ATTORNEY Patented Jan. 9, 1951

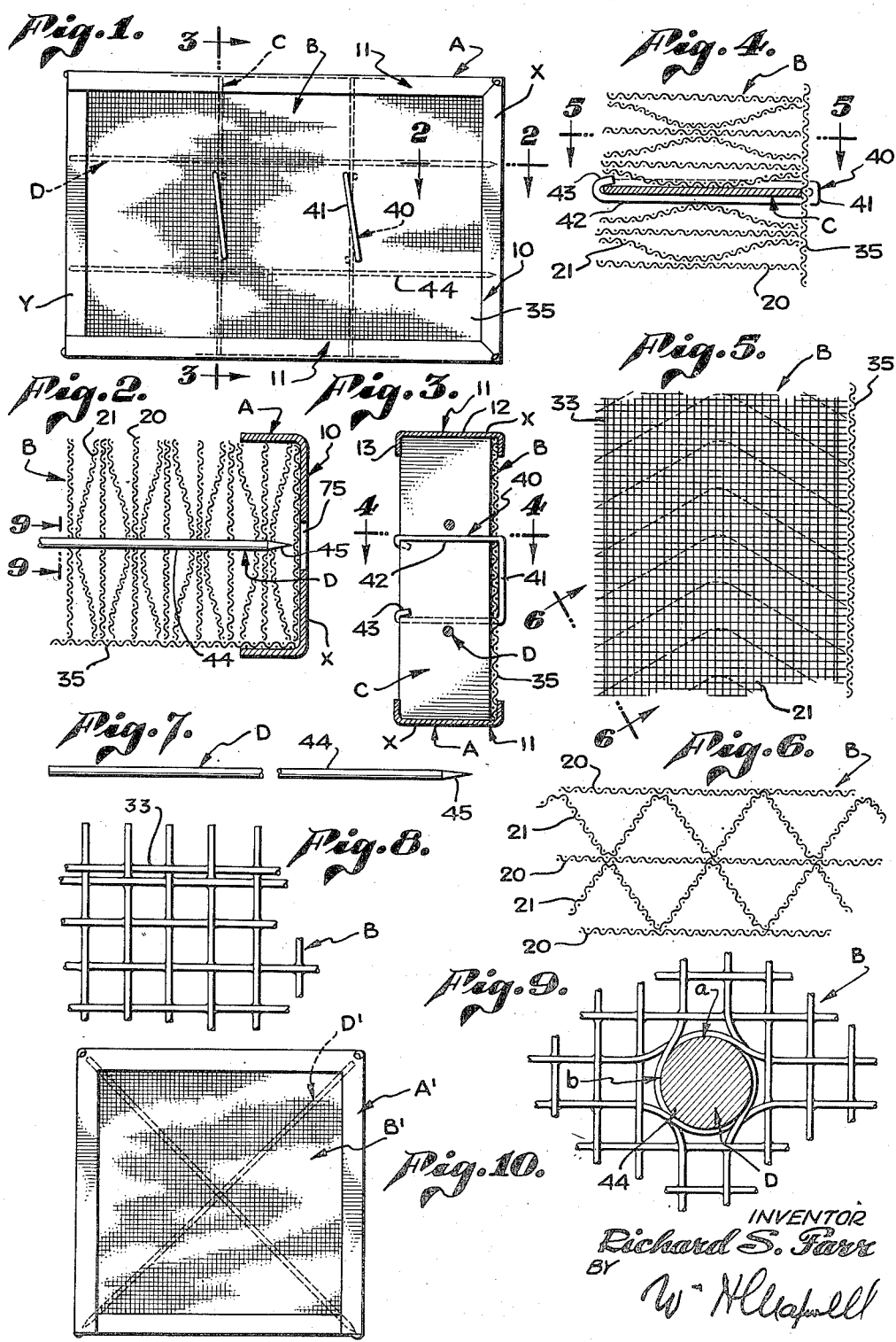

2,537,217

UNITED STATES PATENT OFFICE 2,537,217

FILTER UNIT

Richard S. Farr, Los Angeles, Calif., assignor to Farr Company, Los Angeles, Calif., a corporation of California Application September 27, 1946, Serial No. 699,943

24 Claims. (Cl. 183—71)

This invention relates to a filter unit and it is a general object of the invention to provide a simple, practical and improved construction for a filter unit effective for filtering air.

This application is filed as a continuation in part of my co-pending application entitled "Air Filter Panel" filed March 9, 1943, Serial No. 478,513, now abandoned.

Features of my invention are applicable, generally, to filters. However, my invention is primarily concerned with what I may term metallic filters or with filters involving filters made of wire screen, and it is particularly useful and practical for handling air to separate dust or like foreign particles therefrom. I will in describing my invention refer to it as a metal air filter, and I will disclose a form of the invention particularly suited for handling air to separate dust or like foreign particles therefrom. However, it is to be understood that I do not wish such specific references to be interpreted as a limitation or restriction upon the broader principles that I teach.

It is a general object of this invention to provide a filter unit involving a filler or filter pad comprising a laminated structure formed of wire screening and reinforced against failure or distortion and also against shifting or working of the sheets of screening. Metal air filters such as I am concerned with are used extensively to filter air for internal combustion engines and consequently they are in many cases subject to vibration, and in the event of engine backfire they are subjected to excessive pressures or surges. It will be understood that where a wire screen type air filter is employed to catch dust, or the like, it is desirable that the filter or filter parts be maintained in a compact, tight form and that they be free of vibration, as otherwise dust or particles that are trapped are simply dislodged.

A further object of this invention is to provide an air filter of the character referred to involving simple, inexpensive, and easily applied structural features which effect desirable reinforcement and stiffening without materially adding either to weight or cost.

It is another object of this invention to provide an air filter of the type in which the filter pad or pack is formed of a plurality of sheets or layers of screening and which involves a simple, effective retaining means that not only stiffens or reinforces the several sheets but bonds them together minimizing danger of vibration and providing a practical, durable, and effective construction.

A further object of this invention is to provide an air filter of the character referred to wherein air is channeled through the filter so that there is a substantially uniform unidirectional flow of air through the filter at all parts.

Another object of the invention is to provide an air filter of the character referred to wherein there are plates that act to channel the air through the filter and also stiffening members which stiffen and bond the sheets of screening together, which plates and stiffening members cooperate to reinforce or stabilize each other and to act together in reinforcing the entire unit.

The various objects and features of my invention will be fully understood from the following detailed description of typical preferred forms and applications of the structure of my invention, throughout which description reference is made to the accompanying drawings, in which:

Fig. 1 is an end or face view of a filter unit embodying the present invention, showing the air directing partitions in dotted lines and also showing the stiffening members in dotted lines. Fig. 2 is an enlarged detailed sectional view taken substantially as indicated by line 2—2 on Fig. 1. Fig. 3 is a sectional view taken as indicated by line 3—3 on Fig. 1. Fig. 4 is an enlarged transverse sectional view taken as indicated by line 4—4 on Fig. 3. Fig. 5 is a view taken substantially as indicated by line 5—5 on Fig. 4 with the corrugations occurring in one of the screens of the filter pad indicated in dotted lines. Fig. 6 is an enlarged view taken as indicated by line 6—6 on Fig. 5, being a view showing the manner in which the plain and corrugated screens are superimposed or arranged in the laminated construction that forms the filter pad. Fig. 7 is a view showing a reinforcing or stiffening member apart from the rest of the structure. Fig. 8 is an enlarged view showing the manner in which the edge portion of the screen is formed so that it is not subject to fraying or distortion. Fig. 9 is an enlarged detailed view taken as indicated by line 9—9 on Fig. 2, being a view showing the manner in which each sheet of screen involved in the filter pad grips the stiffening rod located in the pad. Fig. 10 is a view similar to Fig. 1, showing a unit of slightly different form and indicating a different arrangement of stiffening members in the pad. Figs. 11 and 12 are views illustrating the manner in which I carry out my method of applying a stiffening rod to a metal filter pad. Fig. 13 is an edge or side view of a modified form of unit wherein the frame of the unit instead of being flat or in a single flat plane, is arcuate or curved, the view showing a pad in its initial form ready for insertion into the arcuate frame. Fig. 14 is a sectional view taken as indicated by line 14—14 on Fig. 13 and Fig. 15 is a view similar to Fig. 13 except that the pad is in place, the stiffening rod of the pad being shown curved to conform to the curvature or arcuate shape of the frame. Fig. 16 is a view taken at one corner of the frame showing the construction that I provide for joining a side of the frame with the end which is separable from the side, and Figs. 17, 18 and 19 are views illustrating the steps that I employ in assembling the structure to gain a finished structure wherein the detachable section of the frame is hooked in place and is maintained in that position by the resiliency of the pad within the frame.

The structure that I will first describe being the form of the invention illustrated in Figs. 1 to 9, inclusive, and 16 to 19, inclusive, involves, generally, a rigid holder or frame A, one or more filter pads B carried in the frame, one or more partitions C serving to reinforce and stiffen the structure to channel air therethrough, and one or more stiffeners D incorporated in the filter pad or assembly of filter pads carried in the frame.

The frame A of my construction is a mounting element or carrier for the pad or pads that I employ, and in practice it may vary widely in form, shape and proportions. In the form of the invention being described I show a frame that is polygonal in form and shape and which is sectional in construction. When the frame is square or rectangular in form it may have a main section X which is U-shaped, and it may have a simple straight end section Y which forms a closure for the U-shaped main section. In the particular frame illustrated the main section X of the frame has what may be termed an end portion 10 and parallel side portions 11 projecting from the ends of the portion 10. The closure section Y of the frame is joined to and extends between the outer ends of the side portions 11 and when in place the frame is complete and forms an effective holder or enclosure for the filter pad or pads, as the case may be. In accordance with the preferred form of my invention each frame part, that is, each end part and each side part of the frame is channel-shaped in cross-sectional configuration and involves an outer wall 12 and inwardly projecting side walls or flanges 13 extending inward from the sides or margins of the walls 12, as clearly shown in Fig. 3 of the drawings.

In the preferred form of my invention the means provided for joining or securing the ends of the frame section Y to the outer ends of the side members 11 of frame section X is preferably a hook means. The form of hook means illustrated in Figs. 16 to 19 of the drawings involves a tongue 15 projecting from the outer end of each side member 11 and turned inwardly and back to form an inwardly facing hook, as clearly shown in Figs. 17, 18 and 19 of the drawings. Bars 16 are provided at the ends of the frame member Y to be engaged in the hooks formed by the parts 15. The bars 16 may be formed at the ends of frame section Y by providing inwardly turned flanges at the ends of this frame section and by providing openings or passages 17 where the flanges join the frame section, which openings serve to admit or accommodate the hook parts as will be apparent from the drawings. When the hook type fastening means is employed I may provide a lock for positively preventing release of the bars 16 from the hooks 15. In the preferred form of the invention the locking means illustrated involves locking pins 18 inserted through the end portions of the side members 11 and the hook parts 15, as well as through the bars 16, as clearly illustrated in Fig. 19 of the drawings.

In accordance with the broader principles of my invention I may employ one or more filter pads or bodies in a frame such as the frame A. The pad or pads B are such as to form a structure or assembly that occupies the frame A so that it is confined laterally between sides 12 of the frame parts and endwise or axially of the unit by the flanges 13. In Fig. 1 I illustrate a unit wherein there are three separate or distinct filter pads adjacent pads being separated by partitions C, as will be hereinafter described.

Each pad B is a metal pad involving a multiplicity of metal parts so arranged and related as to form a ready passage for air at the same time forming tortuous channels or passages through which the air must move, to the end that particles carried by the air are deposited in the pad. I preferably employ a metal pad formed entirely of wire screening or screens. A highly efficient, practical metal pad of this type is provided by establishing a laminated structure or pad involving alternately arranged flat and corrugated sheets of screening. In the drawings I illustrate flat sheets 20 of wire screening and corrugated sheets 21 of wire screening, and as I have shown in the drawings, I prefer to alternate the flat and corrugated sheets. For most satisfactory results I do not provide simple, straight corrugations in the corrugated sheets 21 either axially of the unit or in any other particular direction, but rather I provide angular corrugations such as are indicated in dotted lines Fig. 5 so that the clear air passages established by the corrugations do not extend straight through the pad from one side to the other, but establish zig-zag courses for the air to the end that no air finds its way straight or directly through the pad, but all air passing through the pad is deflected one way or another from a truly axial course.

When employing wire screening in the formation of the filter pad and for ordinary purposes, that is, for handling air, I prefer to employ screening of the type and weight ordinarily employed as window screening. It is desirable, however, to employ a screen construction wherein the meshes or wires are not all uniform but rather have the outermost strands or edge wires 33 woven somewhat closer together than are the other strands, thus giving stability and rigidity to the edges of the screens or sheets making it simple to handle them in the course of manufacture.

In accordance with my invention I provide the wires of the sheets of screening with a coating of a material which serves as a binder to retain the sheets in position or against racking. It is significant that I employ a coating or binder on the sheets of screening which is softened by the application of heat so that the stiffeners which I apply, in accordance with the method that I have provided, are bonded or bound to the sheets of the pad by the binder initially applied to the sheets and serving at all times to hold the sheets against racking. I may, in practice, use various materials as the coating or binder on the sheets of screening. As an example of a simple, practical material I will refer to common varnish, which may be applied to the sheets in a very thin film so that it is barely detectable.

When I provide a partition or partitions C in the unit I prefer that each partition be formed of a single flat sheet of material such as metal, and in practice I can employ thin sheet metal. In the form of the invention being described I show three pads B in which case I employ two partitions C as is clearly shown in Fig. 1 of the drawings. In the arrangement illustrated the pads C are in planes parallel with the axis of the unit and they extend between the sides 11 of frame section X.

Ordinarily I find it unnecessary to employ any screening or sheets in the structure other than the flat and corrugated screens 20 and 21. However, I may, as I have shown in the drawings, employ an end sheet 35 of screening at either or both ends of the unit. In the drawings, I have shown a single end sheet 35 and I have shown the partitions C anchored to the end sheet 35 by ties 40. The ties are U-shaped wires with outer parts 41 engaged over the outer side of the sheet 35 and having legs 42 extending at opposite sides of the partition and provided at their ends with hooks 43 engaging around the partition. Through such a construction the partition is effectively joined to the sheet 35 and the sheet in turn is bound in the structure or is retained between the pads B and the frame, as clearly shown in Fig. 3 of the drawings.

In accordance with my invention I provide the structure with one or more stiffeners D. In the particular case being described I show two stiffeners D and I show them arranged in spaced relation and extending lengthwise across the unit from one end to the other. Each stiffener D is preferably a simple, straight wire or light rod incorporated entirely within or confined to the pad or assembly of pads that is, in turn, arranged in the frame. It is important that the stiffener or stiffeners, as the case may be, be confined entirely within the confines of the pad or assembly of pads, so that there are no ends or projections protruding in a manner to in any way interfere with the frame or other parts as the pads are being handled, or as they are being assembled into the frames, in that projecting parts such as the ends of members such as the stiffeners materially impede assembly and are generally undesirable.

In accordance with my construction I employ a stiffener D preferably a length of wire such as the length 44 of wire shown in Fig. 7, which is somewhat larger in cross section than the openings or mesh of the screening employed in the sheets 20 and 21. By thus providing a wire 44 as a stiffener which is larger than the mesh of the screening, and by applying the stiffener by the method that I will hereinafter describe, I obtain a finished structure in which the stiffener passes through each sheet of the pad, spreading wires of the sheet so that the stiffener is effectively gripped by the wires in two different directions, that is, in the direction indicated by the arrow $a$ in Fig. 9, as well as in the direction indicated by the arrow $b$ in Fig. 9. It is to be understood how the mesh or woven construction of the sheets tends to maintain the wires of the sheets in parallelism and how insertion of the wire 44 to a position such as is shown in Fig. 9, causes flexure of the wires of the sheet, leaving them in a condition so that they effectively bear against the wire 44 and grip it. Furthermore the presence of the binder or coating that I provide on the sheets of screening resists spreading of the wires of the sheet to admit the stiffener wire 44 and thus tends to concentrate the spread of the wires of the sheet to the point where the stiffener wire 44 passes through the sheet. The particular stiffener wire 44 illustrated in the drawings is provided at one end with a sharpened part or point 45 to facilitate its being operated in accordance with the method that I have provided, whereas the other end of the wire 44 is preferably plain and simply cut off, as shown in Fig. 7.

In the form of the invention illustrated in Fig. 10 of the drawings I show a frame A' which is substantially square rather than being elongated as is the frame shown in Fig. 1. There is a single pad B' shown in Fig. 10 and this pad is free of or is without partitions C. The pad B' is, however, provided with two stiffeners D' and these stiffeners, instead of being spaced and parallel and extending parallel with the side parts of the frame, as are the stiffeners in Fig. 1, are crossed or angularly related being arranged so that they extend between the corners of the pad B' providing a crossed stiffening structure in the pad.

In the form of the invention illustrated in Figs. 13 to 15 the frame $A^2$ instead of being a flat rectangular frame is a rectangular frame that is arcuate or curved. When this form of the invention is fully assembled, as shown in Fig. 15, the stiffening member or members $D^2$ extend lengthwise or in the direction of curvature. In fact, they follow the contour or curvature of the frame $A^2$ in spite of the fact that, as initially formed, the pad has the members $D^2$ in it so that they are straight as they are in the pad shown in Fig. 1. In accordance with the method that I will hereinafter describe I am able to place the filter pad having one or more straight stiffening members $D^2$ in the arcuate frame $A^2$ so that in the finished form the stiffening member or members are arcuate like the frame, and I utilize the presence of the stiffening members in the frame to maintain the pad against undesirable deflection in the course of its being arranged in place in the frame.

In accordance with the method that I have provided and which is the subject of my divisional application entitled "Method of Making Filters," filed August 30, 1949, Serial No. 113 232, I form a filter pad involving an assembly of screens, preferably a laminated structure involving alternate flat and corrugated screens, by first holding the assembly of screens in the desired relationship, as shown in Fig. 11. I may, for example, provide a carrier 50 that will properly accommodate the desired laminated assembly of screening. The stiffener to be applied to or incorporated in the laminated metal assembly is mounted in a spinner S which may involve a chuck 60 to hold the stiffener wire and a suitable motor 61 and drive 62 for operating the chuck at the desired speed. In Figs. 11 and 12 I illustrate an arrangement that may be used to advantage in which arrangement the chuck 60 is arranged in a fixed position, whereas the carrier 50 holding the laminated assembly of wire screens is mounted on a movable carriage 70. The carriage shown has a guide 71 through which the stiffener passes immediately before entering the assembly of wire screening. With the spinner operating at a suitable speed, say, for instance, at about 2000 R. P. M. and the outer end of the guide wire guided in the guide 71, the carriage 70 is advanced toward the chuck 60 with the result that the outer pointed end 45 of the stiffener wire successively enters the mesh of the sheets of screening spreading the wire thereof, as illustrated in Fig. 9. When employing a wire stiffener 44 formed of a number 10 wire, and when turning the stiffener at about 2000 R. P. M. a stiffener wire about 36 inches long can be readily advanced into a metal filter pad. The speed of advance may vary widely. However, I prefer to feed the carriage 70 as rapidly as possible without causing buckling or distortion of the spinning stiffener wire 44.

The spinning wire with the pointed end is, in effect, drilled through the metal pad or it may be said to be spun through the metal pad, and in being inserted by a drilling or spinning action a substantial amount of heat is generated and the heat thus generated serves to soften the binder on the sheets of screening. When the stiffener wire is finally drilled or spun into place the spinning or drilling operation is stopped and the heat generated by the application of the stiffener is quickly dissipated so that the binder on the screening almost immediately adheres to the stiffener to act with the gripping effect of the wires of the several sheets of screening, to the end that the binder is permanently, securely and dependably anchored in the filter pack.

In accordance with the structure that I provide the side members or ends of the frame A are provided with access openings or apertures 75 at the points where the stiffener wires 44 occur so that I may, if I desire, apply the stiffener wires to the pad or pads after the pad or pads have been assembled in the frame. In accordance with the broader principles of my invention, however, I contemplate application of the stiffener wires to the assembly of wire screening either before or after application of the pads to the frame. By having provided a structure wherein the stiffener wire or wires are entirely free of and are in no way connected to the frame, I am able to conveniently and efficiently apply them either before or after application of the pads to the frame, and if they are to be applied after the pads have been applied to the frame it is merely necessary to provide the frame with the necessary access openings 75.

Further, in accordance with the method that I have provided, I simultaneously engage the hook connections between the frame sections and provide an assembly wherein the pad or pads are under compression with the pads exerting pressure to hold the hook connections tight. My initial step is to arranged the pad or pads in the U-shaped main section of the frame and to apply the end section of the frame to the outer or exposed end of the pad or pad assembly. I then spread the side members 11 of the frame section X slightly apart or outward, as shown in Fig. 17, and follow the spreading of the sides of the frame section X with collapsing pressure on the pad or pads, which collapsing pressure is applied through the end section Y toward the end 10 of the main frame section X. When the pad or pad assembly has been compressed to a position such as is shown in Fig. 18 I return the sides 11 of the main frame section X to their original and normal position, and in so doing I engage the hooks 15 over the bars 16. I then release the compressing pressure from the pad or pad assembly allowing the resilience of the metal structure of the pad to force the end section Y of the pad outwardly, as indicated by the arrows in Fig. 18, until the bars 16 are seated in the hooks 15, as shown in Fig. 19 of the drawings. I preferably proportion the pad or pad assembly to the frame so that the pad continues to exert a pressure outward on the end section Y of the frame, thus maintaining the several sheets of the pad or pad assembly in tight seated engagement one with the other. When lock pins 17 are employed they are inserted following engagement of the bar 16 with the hooks 15.

When employing the form of the invention illustrated in Figs. 13 to 15, inclusive, I prefer to apply the stiffening wire or wires to the pad preliminary to the pad being arranged in the arcuate frame. In that case my first step is to arrange the flat stiffened pad at the open end of the U-shaped arcuate frame section and then apply pressure to the outer or upper end of the pad or pad assembly, as indicated by the arrow in Fig. 13, forcing the pad down or through the curve of the frame until the pad is finally completely seated in the frame. In the course of this application the initially flat pad, even though stiffened by the stiffening wire or wires, is curved or bent to conform to the arcuate formation of the frame so that in the final assembly the entire pad is arcuate in form and the stiffening wires $D^2$ incorporated therein are likewise or correspondingly curved or arcuate. In the course of this operation it is highly advantageous to have the stiffening wires incorporated in the laminated assembly of screening as they serve to prevent distortion or buckling of the pad as it is being forced into the arcuate frame.

In practice I have found it advantageous to apply the filter pads to the frames or to insert the filter pads in the frames and to join the sections of the frames prior to application of the stiffener or stiffeners, in which case the access openings in the frame parts are necessary. Further, in carrying out my method I employ a stiffener longer than necessary, while the drilling or spinning-in operation is being performed, and when the stiffener is in place I cut off the excess portion of the stiffener and, in practice, I make the access openings in the frame large enough to facilitate this operation. Furthermore, it is significant that as I drill or spin the stiffener or stiffeners into the metallic pad I, by that operation, penetrate the pad not only by spreading the wires of the screens which make up the pad, but also by penetrating sheet metal parts such as partitions that may be present in the pad. For example, I may initially form or assemble the pad by assembling the wire screens and the partitions and thereafter I apply or drill into place the stiffeners.

From the foregoing description it will be apparent that I have, by my present invention, provided a filter unit which involves an exceedingly simple frame, a significant feature of the frame being the hooked construction by which the detachable section is secured to the main section. Further, it will be apparent that I have provided a metal filter pad or a filter pad formed of metal screening which type of pad is such as to effectively resist the application of any ordinary reinforcing means. The stiffening wires or rods that I have applied are confined to the pad or pad assembly and as above pointed out, are thereby entirely free of the frame and provide a simplified, practical construction having the features and advantages of effective reinforcement and stiffening without the difficulties and disadvantages inherent in structures where reinforcing structures are dependent upon the frame for anchorage or support. Furthermore, it is significant to note that I have provided a pad involving a stiffening wire extening therethrough and having the wires of the sheets of screening that form the pad bonded together and in gripping and bonded engagement with the stiffening wire.

Having described only typical preferred forms and applications of my invention, I do not wish to be limited or restricted to the specific details herein set forth, but wish to reserve to myself any variations or modifications that may appear to those skilled in the art and fall within the scope of the following claims.

Having described my invention, I claim:

1. A filter unit including, a metal pad formed of a plurality of sheets of wire screen laid one over the other in a laminated mass, and a rigid rod in the mass passing through each of the sheets, the openings through the screens being smaller than the rod and one opening of each screen being enlarged by passage of the rod so the rod is gripped by the screen, and a frame holding the pad by its edges and under compression in a direction normal to the planes of the sheets.

2. A filter unit including, a metal pad formed of a plurality of separate sheets of metal screen forming a pack and a stiffening rod engaged through each of the sheets, bonding connecting the rod and sheets holding the sheets in predetermined positions and against movement relative to each other, and a frame supporting the pad by engaging the edge portions of the pack of sheets.

3. A filter unit including, a pad formed of a plurality of separate sheets of metal wire screen coated with a binder and laid one over another forming a pack, and a stiffening rod through the pack engaged through each sheet and bonded to each of the sheets by the coating on the sheets, and a frame supporting the pad.

4. A filter unit including, a pad formed of a plurality of separate sheets of metal wire screen coated with a binder and laid one over another forming a pack, and a stiffening rod through the pack passing through each sheet and deflecting adjacent wires of each sheet so they bear on and grip the rod, the rod being bonded to each sheet by the coating on said wires, and a frame supporting the pad.

5. A filter including, a frame defining an opening, a substantially flat partition in the frame with its plane in the direction of the opening through the frame, packs at each side of the partition each including wire screens the planes of which are parallel with that of the partition, and a stiffening rod extending through the packs of screens and through the partition, the rod being in engagement with each screen.

6. A filter pad including a sheet metal partition, a laminated pack of wire screening at each side of the partition, and a stiffening rod extending through each screen of each pack and through the partition, the rod being in pressure engagement with the screens to be gripped thereby.

7. A filter including, a substantially rigid frame having separable sections and hook means joining the sections, and a filter pad held in the frame and including a plurality of superimposed layers of wire screen held tight together by the frame and acting to normally hold the hook means engaged.

8. A filter unit including, a metal pad formed of a plurality of sheets of wire screen laid one over the other in a laminated mass, and a rigid rod in the mass passing through each of the sheets, the openings through the screens being smaller than the rod and one opening of each screen being enlarged by passage of the rod so the rod is gripped by the screen, and a frame holding the pad by its edges.

9. A filter unit including, a metal pad formed of a plurality of sheets of wire screen laid one over the other in a laminated mass, and a rigid rod in the mass passing through each of the sheets, the openings through the screens being smaller than the rod and one opening of each screen being enlarged by passage of the rod so the rod is gripped by the screen, and a frame holding the pad by its edges, the rod being disposed in the mass with its longitudinal axis normal to the planes of the sheets of screen through which the rod is engaged.

10. A filter unit including, a metal pad formed of a plurality of sheets of wire screen laid one over the other in a laminated mass, and a rigid rod in the mass passing through each of the sheets, the openings through the screens being smaller than the rod and one opening of each screen being enlarged by passage of the rod so the rod is gripped by the screen, bonding connecting the rod and sheets holding the sheets in predetermined positions and against movement relative to each other, and a frame holding the pad by its edges, the rod being disposed in the mass with its longitudinal axis normal to the planes of the sheets of screen through which the rod is engaged.

11. A filter unit including, a metal pad formed of a plurality of sheets of wire screen laid one over the other in a laminated mass, a frame supporting the pad by its edges, and a rigid rod extending through the pad to pass through a plurality of the sheets and being inclined relative to the planes of the sheets to extend diagonally through the mass and be slanted relative to each sheet, the size of the rod being related to the size of openings through the screens so the screens are deformed where the rod is engaged therethrough and thus grip the rod.

12. A filter unit including, a metal pad formed of a plurality of sheets of wire screen laid one over the other in a laminated mass, a frame supporting the pad by its edges, a rigid rod extending through the pad to pass through a plurality of the sheets and being inclined relative to the planes of the sheets to extend diagonally through the mass and be slanted relative to each sheet, and bonding connecting the rod and sheets holding the sheets in predetermined positions and against movement relative to each other, the size of the rod being related to the size of openings through the screens so the screens are deformed where the rod is engaged therethrough and thus grip the rod.

13. A filter unit including, a substantially rectangular metal pad formed of a plurality of sheets of wire screen laid one over the other in a laminated mass, a frame supporting the pad by its edges, and a stiffening rod extending diagonally through the pad between opposite corners thereof to be slanted through each of the sheets, the size of the rod being related to the size of openings through the screens so the screens are deformed where the rod is engaged therethrough and thus grip the rod.

14. A filter unit including, a substantially rectangular metal pad formed of a plurality of sheets of wire screen laid one over the other in a laminated mass, a frame supporting the pad by its edges, a stiffening rod extending diagonally through the pad between opposite corners thereof to be slanted through each of the sheets, and bonding connecting the rod and each of the sheets holding the sheets in predetermined positions and against movement relative to each other, the size of the rod being related to the size of openings through the screens so the screens are deformed where the rod is engaged therethrough and thus grip the rod.

15. A filter unit including, a rigid rectangular frame formed of connected members with spaced flanges defining inwardly faced channels, and a flat rectangular pad carried in the frame and having edge portions and corner portions held in said channels, the pad including, a plurality of open mesh alternately plain and corrugated wire screens laid one against another and in planes normal to that of the pad, and a straight rigid rod embedded in the mass and extending through the screens and into opposite corner portions of the pad, the size of the rod being related to the mesh of the screens so each screen is spread where the rod extends therethrough.

16. A filter unit including a pad formed of a plurality of sheets of wire screen laid one over the other in a laminated mass, a frame supporting the pad by its edges, and a plurality of stiffening rods extending through the pad in different directions relative to each other and with each rod extending through a plurality of the sheets, the size of the rods being related to the openings through the sheets so each sheet is deformed where a rod extends therethrough and thereby grips the rod, the rods being inclined to the planes of the sheets so each rod is slanted through each sheet engaged thereby.

17. A filter unit including a pad formed of a plurality of sheets of wire screen laid one over the other in a laminated mass, a frame supporting the pad by its edges, a plurality of stiffening rods extending through the pad in different directions relative to each other and with each rod extending through a plurality of the sheets, and bonding connecting the rods and the sheets engaged thereby holding the sheets in predetermined positions and against movement relative to each other, the size of the rods being related to the openings through the sheets so each sheet is deformed where a rod extends therethrough and thereby grips the rod, the rods being inclined to the planes of the sheets so each rod is slanted through each sheet engaged thereby.

18. A filter unit including a pad formed of a plurality of sheets of wire screen laid one over the other in a laminated mass, a frame supporting the pad by its edges, and a plurality of stiffening rods extending through the pad, each rod being engaged through each sheet of the mass, the size of the rods being related to the openings through the sheets so each sheet is deformed where a rod extends therethrough and thereby grips the rod, the rods being pitched to extend in different directions relative to each other and to be inclined to the planes of the sheets so each rod is slanted through each sheet.

19. A filter unit including a pad formed of a plurality of sheets of wire screen laid one over the other in a laminated mass, a frame supporting the pad by its edges, a plurality of stiffening rods extending through the pad, each rod being engaged through each sheet of the mass, and bonding connecting each rod and each sheet thereby holding the sheets in predetermined positions and against movement relative to each other, the size of the rods being related to the openings through the sheets so each sheet is deformed where a rod extends therethrough and thereby grips the rod, the rods being pitched to extend in different directions relative to each other and to be inclined to the planes of the sheets so each rod is slanted through each sheet.

20. A filter unit including a pad formed of a plurality of sheets of wire screen laid one over the other in a laminated mass, a rectangular frame supporting the pad by its edges, and a plurality of stiffening rods extending through the pad in different directions to cross one another and with each rod slanted through a plurality of the sheets and between opposite corners of the frame so each sheet is deformed where a rod extends therethrough and thereby grips the rod.

21. A filter unit including a pad formed of a plurality of sheets of wire screen laid one over the other in a laminated mass, a rectangular frame supporting the pad by its edges, a plurality of stiffening rods extending through the pad in different directions to cross one another and with each rod slanted through a plurality of the sheets and between opposite corners of the frame so each sheet is deformed where a rod extends therethrough and thereby grips the rod, and bonding connecting each rod and each sheet thereby holding the sheets in predetermined positions and against movement relato to each other.

22. A filter unit including, a pad formed of a plurality of sheets of wire screen laid one over the other in a laminated mass, a frame supporting the pad from its edges, and a plurality of straight stiffening rods extending in different directions through the pad and inclined to the planes of the sheets, each rod being slanted through a plurality of the sheets, the size of the rods being related to the openings through the sheets so each sheet is deformed where a rod extends therethrough and thereby grips the rod, the rods being completely embedded in the mass and crossing each other at the middle of the mass.

23. A filter unit including, a pad formed of a plurality of sheets of wire screen laid one over the other in a laminated mass, a frame supporting the pad from its edges, a plurality of straight stiffening rods extending in different directions through the pad and inclined to the planes of the sheets, each rod being slanted through a plurality of the sheets, the size of the rods being related to the openings through the sheets so each sheet is deformed where a rod extends therethrough and thereby grips the rod, and bonding connecting each rod and the sheets engaged thereby so the sheets are held in predetermined positions and against movement relative to each other, the rods being completely embedded in the mass and crossing each other at the middle of the mass.

24. A filter unit including, a rigid rectangular frame formed of connected members with spaced flanges defining inwardly faced channels, a flat rectangular pad carried by the frame and having edge portions and corner portions held in said channels, the pad including, a plurality of open mesh alternately plain and corrugated screens laid one against another and in planes normal to that of the pad, and a plurality of straight, rigid rods extending in different directions through the pad and inclined to the planes of the screens, each rod being slanted through each screen and the size of the rods being related to the openings through the screens so each screen is deformed where a rod extends therethrough and thereby grips the rod, the rods being crossed at the middle of the pad with each rod extending between opposite corner portions of the pad.

RICHARD S. FARR.

REFERENCES CITED

The following references are of record in the file of this patent:

UNITED STATES PATENTS

| Number | Name | Date |
|---|---|---|
| 1,113,430 | Greenwalt | Oct. 13, 1914 |
| 1,143,655 | Sommers | June 22, 1915 |
| 1,598,097 | Mathis | Aug. 31, 1926 |
| 1,757,690 | Strindberg | May 6, 1930 |
| 1,786,361 | Pahl | Dec. 23, 1930 |
| 1,854,677 | Umensetter | Apr. 19, 1932 |
| 1,883,715 | Greene | Oct. 18, 1932 |
| 1,937,486 | Demers | Nov. 28, 1933 |
| 1,968,436 | Bishop | July 31, 1934 |
| 2,008,751 | Davis | July 23, 1935 |
| 2,286,479 | Farr | July 16, 1942 |
| 2,398,045 | Schaaf | Apr. 9, 1946 |
| 2,425,235 | Ferrante | Aug. 5, 1947 |